US008271798B2

(12) United States Patent
Lwo

(10) Patent No.: US 8,271,798 B2
(45) Date of Patent: *Sep. 18, 2012

(54) LIMITING ACCESS TO PUBLICLY EXPOSED OBJECT-ORIENTED INTERFACES VIA PASSWORD ARGUMENTS

(75) Inventor: Fuhwei Lwo, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 1017 days.

This patent is subject to a terminal disclaimer.

(21) Appl. No.: 12/202,370

(22) Filed: Sep. 1, 2008

(65) Prior Publication Data

US 2008/0320559 A1 Dec. 25, 2008

Related U.S. Application Data

(63) Continuation of application No. 10/825,880, filed on Apr. 17, 2004, now Pat. No. 7,493,492.

(51) Int. Cl.
*H04L 29/06* (2006.01)
(52) U.S. Cl. .......................... 713/183; 726/2
(58) Field of Classification Search .................. 726/1–2, 726/4–6, 18, 26–27, 30; 725/25, 30, 37; 713/167, 183–184; 707/609, 661, 674, 687, 707/694, 705, 708, 722, 728, 749, 756, 758, 707/863, 769, 770, 771, 783, 784; 705/72, 705/75, 76
See application file for complete search history.

(56) References Cited

U.S. PATENT DOCUMENTS

| 5,687,367 | A | 11/1997 | Dockter et al. | |
|---|---|---|---|---|
| 5,920,863 | A | 7/1999 | McKeehan et al. | |
| 5,982,390 | A * | 11/1999 | Stoneking et al. | 345/474 |
| 6,618,765 | B1 | 9/2003 | Banctel et al. | |
| 7,330,872 | B2 * | 2/2008 | Peart et al. | 709/203 |
| 2002/0144009 | A1 | 10/2002 | Cheng et al. | |
| 2002/0199022 | A1 | 12/2002 | Tsang et al. | |
| 2003/0135657 | A1 | 7/2003 | Barker et al. | |
| 2003/0135661 | A1 | 7/2003 | Barker et al. | |

OTHER PUBLICATIONS

"Abstraction of remote operating systems," Research Disclosure, Aug. 2001, pp. 1374-1375.
"Proxy Cursors in System Management," IBM Technical Disclosure Bulletin, vol. 38, No. 10, Oct. 1995, pp. 361-362.

* cited by examiner

*Primary Examiner* — Kim Vu
*Assistant Examiner* — Leynna Truvan
(74) *Attorney, Agent, or Firm* — Steven Bennett

(57) ABSTRACT

Limiting access to publicly exposed object-oriented interfaces is disclosed. A system includes inter-related first objects that share a predetermined password. First object-oriented interfaces define methods supported by the first objects. The first objects publicly expose the first interfaces, which are queryable by the first objects and second objects. Each first interface includes a password argument to limit access to the first objects. The system may also include second object-oriented interfaces that define methods supported by the first objects that publicly expose the second interfaces, which are queryable by the first and the second objects. The second interfaces are required by specification, such as that for the Common Information Model (CIM), and correspond to the first interfaces. The second interfaces lack password arguments to limit access, and the methods defined thereby return "not implemented" messages when invoked. Each second interface is a non-implemented and password-free version of a first interface.

12 Claims, 4 Drawing Sheets

LIMITING ACCESS TO PUBLICLY EXPOSED OBJECT-ORIENTED INTERFACES VIA PASSWORD ARGUMENTS

RELATED APPLICATIONS

The present patent application is a continuation of the previously filed patent application having the Ser. No. 10/825,880, filed on Apr. 17, 2004.

FIELD OF THE INVENTION

The present invention relates generally to object-oriented software environments, and more particularly to access control of methods defined by object-oriented interfaces of objects within such object-oriented software environments.

BACKGROUND OF THE INVENTION

Object-oriented software environments encapsulate functionality and data within software data constructs referred to as objects. Objects are black boxes, in which all interaction therewith is accomplished by calling methods, or procedures, of the objects. The methods of an object are said to be supported by the object, and are particularly defined by object-oriented interfaces. For instance, an object-oriented interface may define the data, if any, that a method of an object receives as input, which is referred to as the arguments of the object-oriented interface, as well as the data, if any, that the method returns as output.

One particular type of object-oriented software environment is the Common Information Model (CIM). The CIM is an object-oriented model for describing management information. It is implementation independent, and allows different management applications to collect data from a variety of different sources. The CIM includes various schemas of objects for systems, networks, applications, and devices, and allows for additional schemas to be added as needed. The CIM can be used in conjunction with the Simple Network Management Protocol (SNMP), in that it provides for the interface of CIM data with SNMP processors for easier network and resource management. The CIM is managed by the Distributed Management Task Force, Inc., and the specification for the CIM is available on the Internet at the web site http://www.dmtf.org/standards/cim/.

Within the CIM, objects may be required by specification to expose certain object-oriented interfaces publicly. That is, a given object, to comply with the CIM, may have to have certain methods that are defined by certain object-oriented interfaces, and which are available to be discovered and called by any other object within the CIM. Such object-oriented interfaces are said to be publicly queryable, because any object can learn of the interfaces by querying the objects supporting these interfaces. Such object-oriented interfaces are said to be publicly callable as well, because any object can call the methods defined by the interfaces.

The requirement that certain object-oriented interfaces be publicly queryable and have their methods publicly callable can be disadvantageous, however. Some objects may wish to reserve certain methods as private methods that are callable only by other, inter-related objects. However, because the object-oriented interfaces defining these methods are required to be publicly queryable, any object can learn of them. Furthermore, where the methods are required to be publicly callable, any object can also call these methods to invoke them, which means that access control limiting the invocation of the methods only to inter-related objects cannot be accomplished.

SUMMARY OF THE INVENTION

The invention relates to limiting access to publicly exposed object-oriented interfaces, via password arguments. A system of the present invention includes a number of inter-related first objects that share a predetermined password. A number of first object-oriented interfaces define methods supported by the inter-related first objects. The inter-related first objects publicly expose the first object-oriented interfaces. The first object-oriented interfaces are thus queryable by both the inter-related first objects as well as second objects, such that these objects are able to learn of the first object-oriented interfaces. However, each first object-oriented interface includes a password argument to limit access to the inter-related first objects sharing the predetermined the password.

Another system of the present invention also includes a number of second object-oriented interfaces that define methods supported by the inter-related first objects. The inter-related first objects publicly expose the second object-oriented interfaces, too. The second object-oriented interfaces are also queryable by both the inter-related first objects as well as the second objects, such that these objects are able to learn of the second object-oriented interfaces. The second object-oriented interfaces are required by specification, such as that for the Common Information Model (CIM), and correspond to the first object-oriented interfaces. The second object-oriented interfaces, however, do not have password arguments to limit access. The methods defined by the second object-oriented interfaces are supported by the inter-related first objects to return a "not implemented" message in response to invocation of the methods, or a similar message that indicates that the functionalities of the methods has not been implemented or executed. These kinds of messages are encompassed under the phrase "a type of 'not implemented' message" as used herein, as can be appreciated by those of ordinary skill within the art, and which is to be construed broadly. Furthermore, where the specific message "not implemented" is indicated elsewhere in the detailed description, it is to be understood that such a message is one specific example of the kinds of messages described here. Each second object-oriented interface is thus a non-implemented and password-free version of one of the first object-oriented interfaces.

A method of the present invention includes an attempt to access a first object-oriented interface that defines a method supported by an inter-related first object, where the access attempt is made by an inter-related second object. The first object-oriented interface includes a password argument to limit access thereto. The first and the second objects share a predetermined password. The first object-oriented interface further has a corresponding second object-oriented interface defining a method supported by the first object. The corresponding second object-oriented interface is required by specification, and lacks a password argument to limit access thereto. Therefore, the method includes the second object passing the predetermined password as the password argument of the first object-oriented interface, so that the second object is able to invoke the method defined by the first object-oriented interface.

An article of manufacture of the present invention includes a computer-readable medium and means in the medium. The computer-readable medium may be a recordable data storage medium, a modulated carrier signal, or another type of medium. The means in the medium is for supporting a first object-oriented interface and a second object-oriented interface, both of which define a method. The first object-oriented interface includes a password argument to limit access thereto inter-related objects, whereas the second object-oriented interface lacks a password argument to limit access thereto.

Embodiments of the invention provide for advantages over the prior art. Access control to the methods defined by object-oriented interfaces is provided by instituting a password argument to accept a predetermined password that is shared among the inter-related objects that are allowed to invoke the methods. Other objects are still able to discover the object-oriented interfaces, since they are publicly exposable, but these objects cannot invoke the methods defined by the object-oriented interfaces, because they do not have the predetermined password.

Furthermore, an object-oriented interface having such a password argument may correspond to another object-oriented interface that is required by specification but that lacks a password argument. The functionality that would otherwise be provided by the required object-oriented interface is instead provided by the object-oriented interface having the password argument. The needed functionality is thus still provided, but by an object-oriented interface that has a password argument, so that access to the methods defined by the object-oriented interface can be limited. Since the object-oriented interface that does not have the password argument is nevertheless required by specification, it could be programmed to return a "not implemented" message. As such, specifications requiring its presence are satisfied. Objects are able to call the methods defined by such an object-oriented interface, although invocation of these methods returns a "not implemented" message instead of performing a given functionality.

Still other advantages, aspects, and embodiments of the invention will become apparent be reading the detailed description that follows, and by referring to the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Overview

Figure 1:
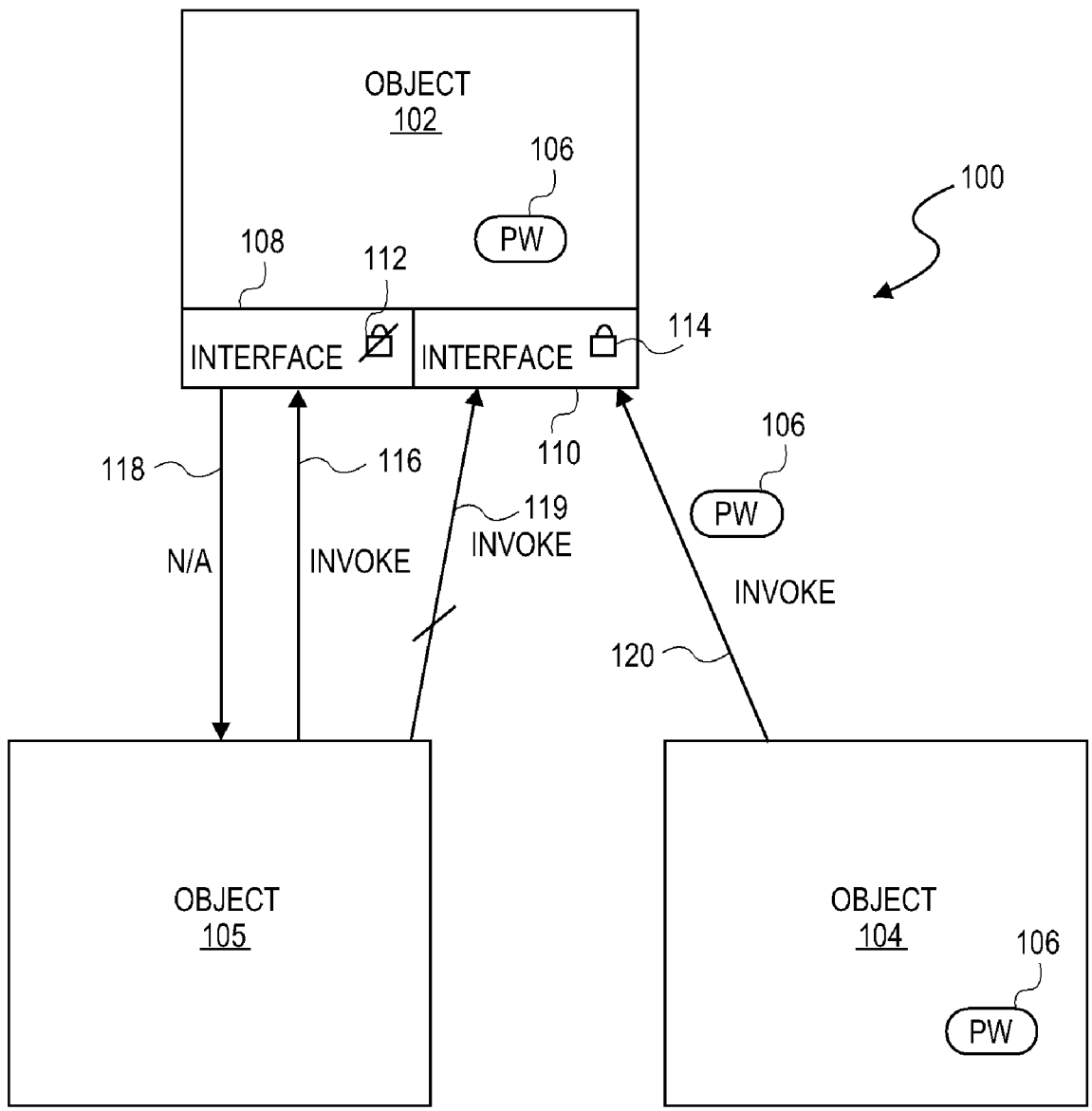
FIG. 1 is a diagram of a system having two inter-related objects sharing a predetermined password, where one of these objects has an object-oriented interface including a password argument to restrict access to the method defined by the interface, and a third object that does not share the password, according to an embodiment of the invention.

FIG. 1 shows a system 100 including objects 102, 104, and 105, according to an embodiment of the invention. The system 100 is an object-oriented software environment, within which functionality and data are encapsulated within the objects 102, 104, and 105. The objects 102 and 104 are inter-related, and therefore can be referred to as the inter-related objects 102 and 104, whereas the object 105 is not inter-related to the objects 102 and 104. The manner in which the objects 102 and 104 are inter-related is not limited by the present invention. For instance, both of the objects 102 and 104 may be plug-in modules, whereas the object 105 may not be, or both of the objects 102 and 104 may be a certain type of object, whereas the object 105 is not of the same type.

The objects 102 and 104 share a predetermined password 106. The password 106 may be considered a unique token that enables the objects 102 and 104 to recognize that they are inter-related. As the objects 102 and 104 are instantiated from defined classes of objects, they may receive the password 106 as part of the instantiation process. For example, the classes of objects of which the objects 102 and 104 are specific instances may include in their definitions the predetermined password 106. The objects 102 and 104 may also receive the predetermined password 106 in a different manner, as can be appreciated by those of ordinary skill within the art.

The object 102 has two publicly queryable and publicly exposed object-oriented interfaces 108 and 110. The object-oriented interfaces 108 and 110 may in one embodiment both define the same type of method that is supported by the object 102. A method is a procedure that performs functionality, such that its invocation is defined by an object-oriented interface. The object-oriented interface specifies the data, if any, that is to be received by the method from a calling object, as well as the data, if any, that is to be returned to the calling object upon completion of the method. The object-oriented interface specifies the data that is to be received by the method as arguments. The object-oriented interfaces 108 and 110 differ in that the object-oriented interface 108 lacks a password argument, as indicated by the crossed-out lock 112, whereas the object-oriented interface 110 has a password argument, as indicated by the lock 114. The object-oriented interface 108 may have one or more arguments not specifically represented in FIG. 1. The object-oriented interface 110 may have one or more arguments in addition to the password argument that are also not specifically represented in FIG. 1.

The object-oriented interface 108, and the method it defines, in particular may be required by the specification of the object-oriented software environment of the system 100. For example, the object-oriented interface 108 may define a create-instance method, which when called instantiates objects of a given type, or creates copies of that object. In order for the object 102 to satisfy the specifications of the object-oriented software environment of the system 100, therefore, the object-oriented interface 108 may have to be present. However, the object 102 may wish to limit invocation of the create-instance method defined by the object-oriented interface 108 to just inter-related objects, such as the object 104, and not the object 105.

Where the arguments that the object-oriented interface 108 are restricted by the specification of the object-oriented software environment, access restriction to the object-oriented interface 108 may not be easily accomplished. Because the object-oriented interface 108 is publicly queryable, any object, such as the object 105 that is not inter-related to the object 102, can query the object 102 to learn of its interfaces, such as the object-oriented interface 108. Furthermore, because the object-oriented interface 108 is publicly exposed, any object, such as the object 105, can call the object-oriented interface 108 to invoke its method.

Therefore, the object 102 also includes the object-oriented interface 110. The object-oriented interface 110, as has been noted, may define the same method as the object-oriented interface 108 does. However, because the object-oriented interface 110 is not required by the specification of the object-oriented software environment of the system 100, the object-oriented interface 110 can include arguments in addition to those included in the object-oriented interface 108. In particular, as has been noted, the object-oriented interface 110 includes a password argument, indicated by the lock 114.

The password argument of the object-oriented interface 110 allows an object that is calling the method defined by the object-oriented interface 110 to pass a password to the object 102 that supports this method. The object 102 can therefore verify that only objects that have the predetermined password 106 are able to invoke the method defined by the object-oriented interface 110. Invocations of the method defined by the object-oriented interface 110 by objects that do not pass the correct password, the password 106, do not result in the object 102 actually performing the functionality of the method. That is, if the password passed in the password argument of the object-oriented interface 110 is not the same as the predetermined password 106, then the object 102 does not actually perform the method defined by the object-oriented interface 110. In this way, access to the object-oriented interface 110 is restricted, even though the interface 110 is publicly queryable and publicly exposable.

Furthermore, the object-oriented interface 108 that lacks a password argument in one embodiment returns a "not implemented" message in response to invocation of the method defined by the object-oriented interface 108. Therefore, the object-oriented interface 108 technically satisfies any requirement of the specification of the object-oriented environment of the system 100 that necessitates the method defined by the object-oriented interface 108. However, in actuality the method defined by the object-oriented interface 108 does not perform any functionality. This method can be called, but just returns a "not implemented" message. Where the method is also defined by the object-oriented interface 110, access to the functionality that would otherwise be provided by the method defined by the object-oriented interface 108 is restricted, because the functionality is only performed via the object-oriented interface 110, which has a password argument, and not via the object-oriented interface 108, which does not have a password argument. The object-oriented interface 108 can be considered to be a non-implemented and password-free version of the object-oriented interface 110.

Thus, embodiments of the invention can be summarized as follows. Within a given system, objects may be forced by specification or other requirements to provide certain interfaces that provide certain functionality, but which are required to be publicly exposed to all other objects. This means, however, that a programmer wishing to restrict invocation of this functionality as provided by the interfaces cannot ordinarily do so. Embodiments of the invention still have objects with the required interfaces that are publicly exposed, but these interfaces instead return a "not implemented," or similar message, when called. Additional, corresponding objects are instantiated that have the same interfaces as the required objects, and that provide the same functionality, but which also include password arguments. When the interface of one of these corresponding objects is called, the object providing the interface verifies that the password argument provided matches a predetermined password, and only then actually performs the functionality. Therefore, unless another object knows the password, it is unable to cause the functionality to be performed. Thus, the programmer is able to restrict access to the functionality to a set of objects that know the password, and other objects that are not privy to the password can cause the functionality to be performed. The required object—the object that does not have the password argument—is still present, but primarily as a placeholder, to satisfy specification or other requirements dictating its presence. Furthermore, the required object can still be called, although it will simply return a "not implemented," or similar message.

Example invocations of the methods defined by the object-oriented interfaces 108 and 110 are now described in relation to the object 105, which is not inter-related to the object 102 and does not share the predetermined password 106, and in relation to the object 104, which is inter-related to the object 102 and shares the password 106. It is presumed that both the objects 104 and 105 have already queried the object 102 to learn of its object-oriented interfaces 108 and 110, and therefore know of the object-oriented interfaces 108 and 110. First, the object 105 may attempt to invoke the method defined by the object-oriented interface 108, as indicated by the arrow 116. Because the object-oriented interface 108 does not have a password argument, the object 105 successfully invokes the method defined by the method defined by the object-oriented interface 108. However, the object 102 simply returns a "not implemented" message in response to this invocation, as indicated by the arrow 118. This is because, to limit access to the functionality that would ordinarily be provided by the method defined by the object-oriented interface 108, the object 102 does not perform the functionality since it may not be allowed to limit access to the object-oriented interface 108.

Second, the object 105 may attempt to invoke the method defined by the object-oriented interface 110, as indicated by the crossed-out arrow 119. However, because the object 105 does not share the predetermined password 106, it is unable to provide the password 106, which is a required argument of the object-oriented interface 110. The object 102 compares whatever the object 105 did pass as the password argument of the object-oriented interface 110, if anything, to the predetermined password 106. Realizing that there is not a match, the object 102 therefore does not perform the method defined by the object-oriented interface 110. Because the functionality provided by the method defined by the object-oriented interface 110 is that which would normally and otherwise be provided by the method defined by the object-oriented interface 108, the inclusion of the password argument within the object-oriented interface 110, and the returning of the "not implemented" message by the method defined by the object-oriented interface 108, effectively limits access to this functionality.

Finally, the object 104 attempts to invoke the method defined by the object-oriented interface 110. In so invoking the method, the object 104 passes the predetermined password 106 as the password argument of the object-oriented interface 110. The object 102 receives the password 106 as the password argument of the object-oriented interface 110, and successfully matches it with the copy of the predetermined password 106 that the object 102 has. As a result, the object 102 performs the functionality of the method defined by the object-oriented interface 110 and supported by the object 102. Access to this functionality thus has been successfully limited to inter-related objects that share the predetermined password 106, such as the object 104, and other objects that do not share the password 106, such as the object 105, cannot invoke methods to cause this functionality to be performed.

CIM-particular Embodiment

Figure 2:
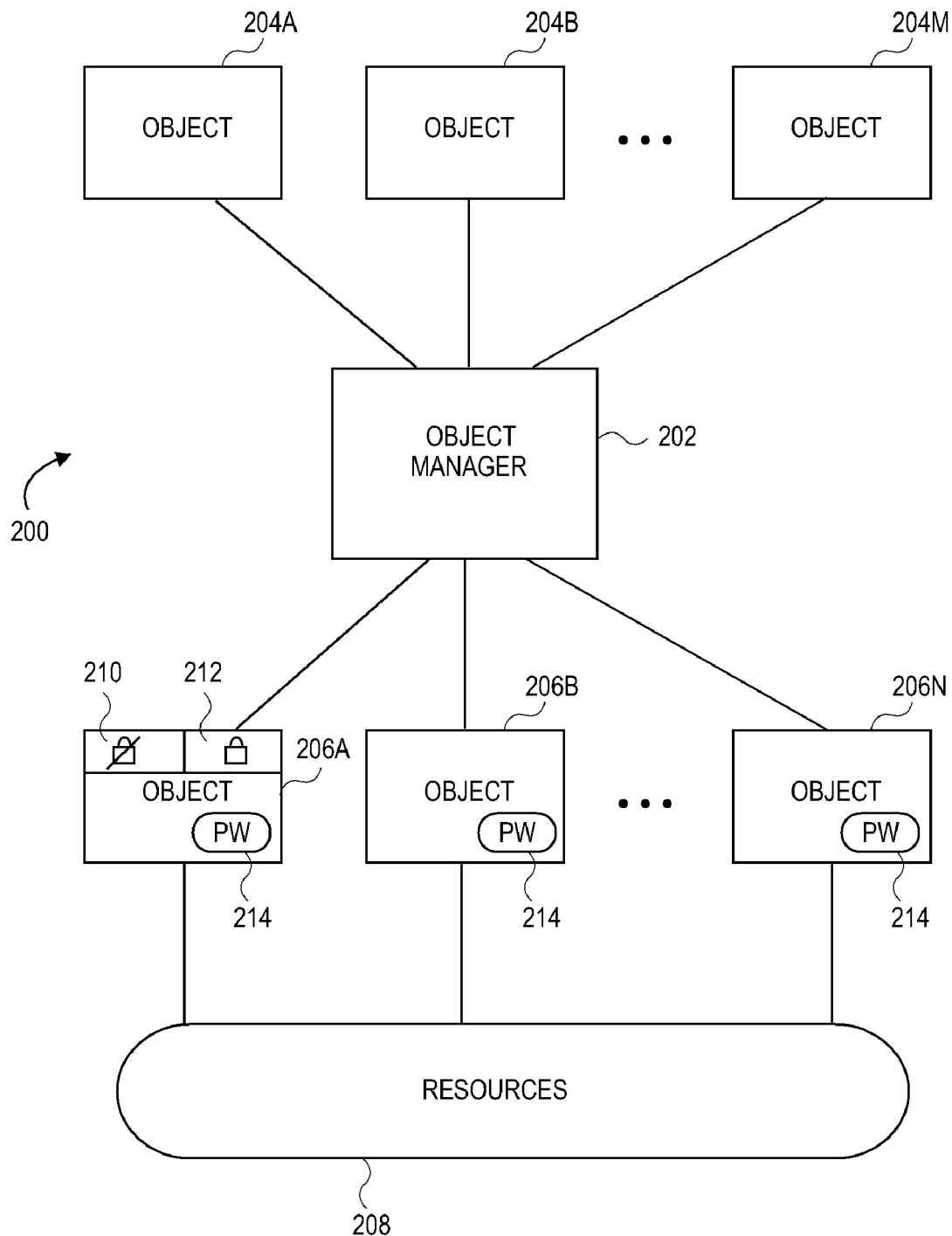
FIG. 2 is a diagram of a system consistent with the Common Information Model (CIM) object-oriented software environment, according to an embodiment of the invention.

Hereinafter, the present invention will be described with reference to Common Information Model (CIM) object-oriented software environment. Those skilled in the art realize that the present invention could be implemented using other suitable object-oriented environments as well. FIG. 2 shows a system 200 that is consistent with the CIM object-oriented software environment, according to an embodiment of the invention. The system 200 includes an object manager 202, objects 204A, 204B, ..., 204M, collectively referred to as the objects 204, objects 206A, 206B, ..., 206N, collectively referred to as the objects 206, and resources 208. The object manager 202 may be referred to as the CIM object manager (CIMOM). The object manager 202 manages communications and interactions among the objects 204 and 206. For instance, queries to determine the object-oriented interfaces of the objects 204 and 206 are handled, or brokered, through the object manager 202, as well as requests to invoke methods defined by the object-oriented interfaces of the objects 204 and 206, and responses to these requests. Therefore, in one embodiment, where queries, invocations of methods, and responses to such invocations of methods are performed as described in the present patent application, such queries, invocations, and responses may be performed in conjunction with, or brokered by, the object manager 202.

The objects 204 may be referred to as client objects, in that they represent client application functionality performed within the system 200 as part of the CIM environment. By comparison, the objects 206 may be referred to as provider objects, in that they provide access to the resources 208 of the system 200, as part of the CIM environment. That is, the objects 206 are plug-in modules that enable the resources 208 to which they interface to be accessed within the system 200, such as by the objects 204 that represent client application functionality performed within the system 200. The objects 206 thus act as proxies between the resources 208 and the object matter 202. The resources 208 may include input devices, output devices, network devices, storage devices, and other types of devices and resources commonly found within computing systems and networks.

The objects 206 are said to be inter-related to one another, such that the objects 206 are inter-related objects, because they all perform provider functionality as described in the previous paragraph. By comparison, the objects 204 are not inter-related to the objects 206. The objects 204 may or may not be inter-related with one another, since the objects 204 may perform comparable or non-comparable functionality.

The objects 206 each publicly expose publicly queryable object-oriented interfaces, as have been described in relation to FIG. 1, that define methods that are supported by the objects 206. Some of these object-oriented interfaces may be required by the specification for the CIM, in that the CIM may require that the objects 206, as provider objects, expose certain types of publicly queryable object-oriented interfaces that define methods that are invokable by all objects, including the objects 204 as well as the objects 206. Other of the object-oriented interfaces may correspond to these CIM-required object-oriented interfaces, in that they provide the same methods, but which add password arguments, so that invocation of their methods can be limited to just the objects 206. All of the objects 206 share the same predetermined password 214. The objects 206 that support the methods defined by object-oriented interfaces that do not add password arguments may return "not implemented" messages in response to invocation of these methods.

For example, the object 206A is specifically depicted as exposing the object-oriented interfaces 210 and 212. The object-oriented interfaces 210 and 212 may both define the same method, where the object-oriented interface 210 does not include a password argument and where the object-oriented interface 212 does include a password argument. The object-oriented interface 210 may be required by the specification for the CIM. So that the object 206A is able to limit invocation of the functionality provided by the method defined by the object-oriented interfaces 210 and 212 to just the other objects 206, the object-oriented interface 212 includes the password argument. Furthermore, the object 206A returns a "not implemented" message in response to another object invoking the method defined by the object-oriented interface 210, since any object, including one of the objects 204, can request the object manager 202 to invoke the method defined by the object-oriented interface 210. The object-oriented interfaces 210 and 212 thus operate comparably to the object-oriented interfaces 108 and 110, respectively, that have been described in relation to FIG. 1.

Each of the objects 206 is able to access the object-oriented interfaces of the other objects 206, because the CIM allows for the objects 206 to act as client objects in the sense that client objects are able to access the object-oriented interfaces of other objects. For example, the object 206B is able to access the object-oriented interface 212 of the object 206A, where the object 206B in so accessing the object-oriented interface 212 acts as a client object in requesting the object manager 202 to invoke the method defined by the object-oriented interface 212. When accessing the object-oriented interface 212, the object 206B passes the password 214 as the password argument of the object-oriented interface 212. The object 206A, upon verifying that the password argument matches its copy of the password 214, performs the functionality of the method defined by the object-oriented interface 212.

None of the objects 204, by comparison, has a copy of the predetermined password 214, and thus none of the objects 204 is able to cause the object 206A to perform the functionality of the method defined by the object-oriented interface 212. The method defined by the object-oriented interface 212 may ostensibly be the same as the method defined by the object-oriented interface 210 that does not have a password argument. However, none of the objects 204 can cause the object 206A to perform the functionality of the method by accessing the object-oriented interface 210, because the object 206A simply returns "not implemented" in response to access of the object-oriented interface 210. The object-oriented interface 210 thus can be considered to be a non-implemented and password-free version of the object-oriented interface 212.

Figure 3:
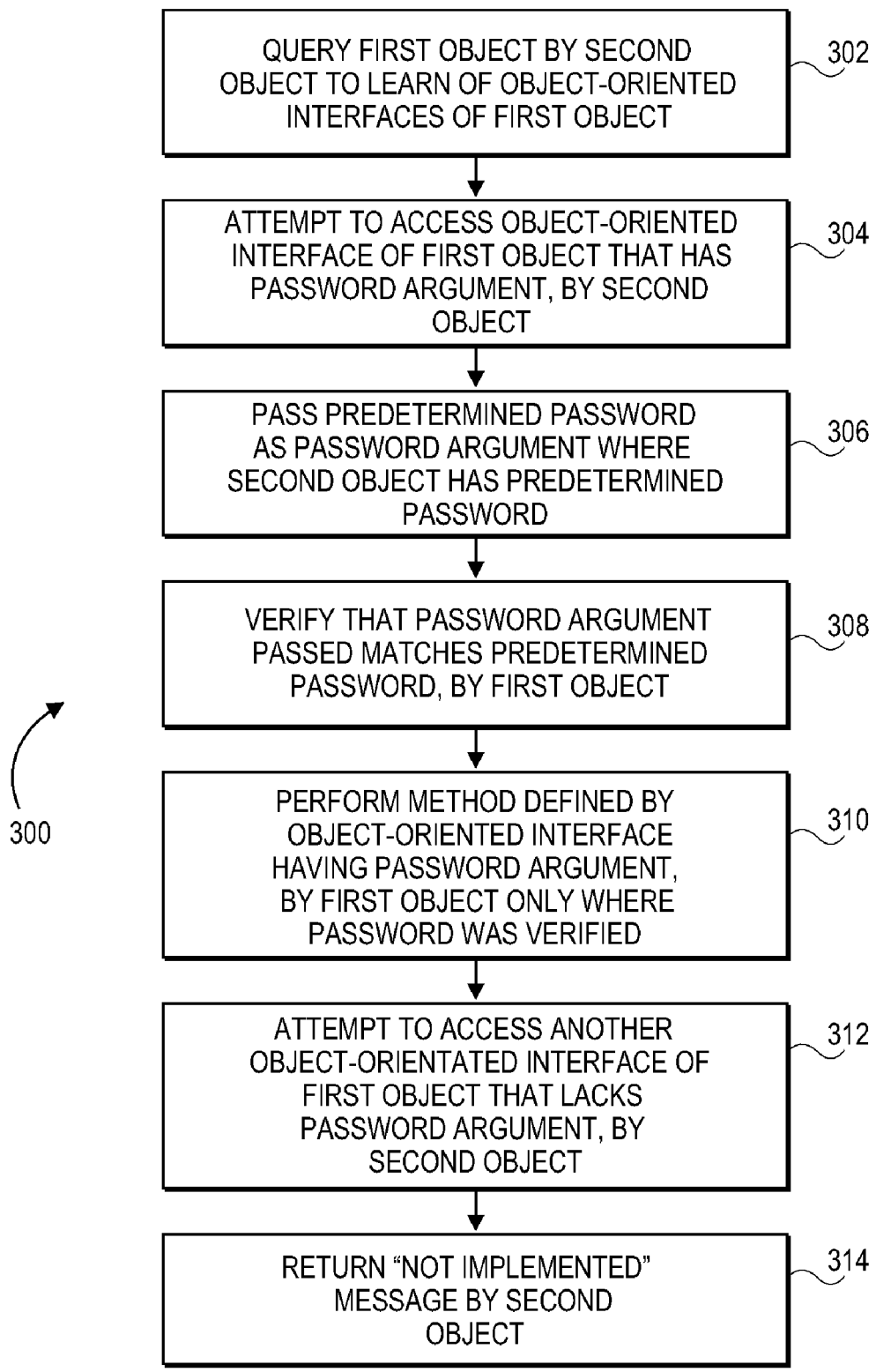
FIG. 3 is a method for limiting access to publicly exposed object-oriented interfaces via password arguments, according to an embodiment of the invention.

FIG. 3 shows a method 300 for restricting access to object-oriented interfaces, according to an embodiment of the invention. The method 300 may be performed in conjunction with the system 200 of FIG. 2 that has been described. For example, the first object that is referred to in the description of the method 300 may be the object 206A, whereas the second object that is referred to may be a different one of the objects 206, or one of the objects 204. The object-oriented interface of the first object that has a password argument that is referred to in the description of the method 300 may be the object-oriented interface 212, whereas the object-oriented interface of the first object that does not have a password argument that is referred to in the description of method 300 may be the object-oriented interface 210. Although an object manager, such as the object manager 202 of FIG. 2, is not explicitly referenced in the description of the method 300, it may be considered as brokering the various queries, requests, and responses that are described in relation to the method 300, in one embodiment of the invention. Furthermore, the method 300 may be implemented within a computer-readable medium of an article of manufacture.

The first object is initially queried by the second object so that the second object is able to learn of the object-oriented interfaces supported by the first object (302). These object-oriented interfaces for sake of descriptive clarity include an object-oriented interface that has a password argument, and a corresponding object-oriented interface that does not have a password argument. The two object-oriented interfaces define the same method, where access thereto via the object-oriented interface having the password argument actually causes performance of the method. By comparison, invoking the method via the object-oriented interface not having the password argument causes the first object to return a "not implemented" message in response.

The second object by way of example first attempts to access the object-oriented interface of the first object that has a password argument (304). In doing so, the second object passes a predetermined password as the password argument where the second object knows or otherwise has access to this password (306). For instance, in the context of the system 200 of FIG. 2, if the second object is one of the objects 206, then it has the predetermined password 214 to pass as the password argument, whereas if the second object is one of the objects 204, then it does not have the predetermined password 214 to pass as the password argument. The first object verifies that the password argument matches the predetermined password (308), and performs the method defined by the object-oriented interface accessed only where verification succeeds (310). In the context of the system 200 of FIG. 2, this means that only the objects 206 can cause performance of the method defined by the object-oriented interface, and not any of the objects 204.

By way of further example, the second object may also attempt to access the other object-oriented interface of the first object, which lacks a password argument (312). In this situation, the second object is able to successfully access the object-oriented interface, but the first object simply returns a "not implemented" message in response (314). Therefore, having one object-oriented interface that has a password argument that corresponds to another object-oriented interface that may be required but that does not have a password argument, in conjunction with returning a "not implement" message in response to access of the object-oriented interface not having a password argument, provides for access control to the method defined by these object-oriented interfaces.

Hardware Environments

Figure 4A:
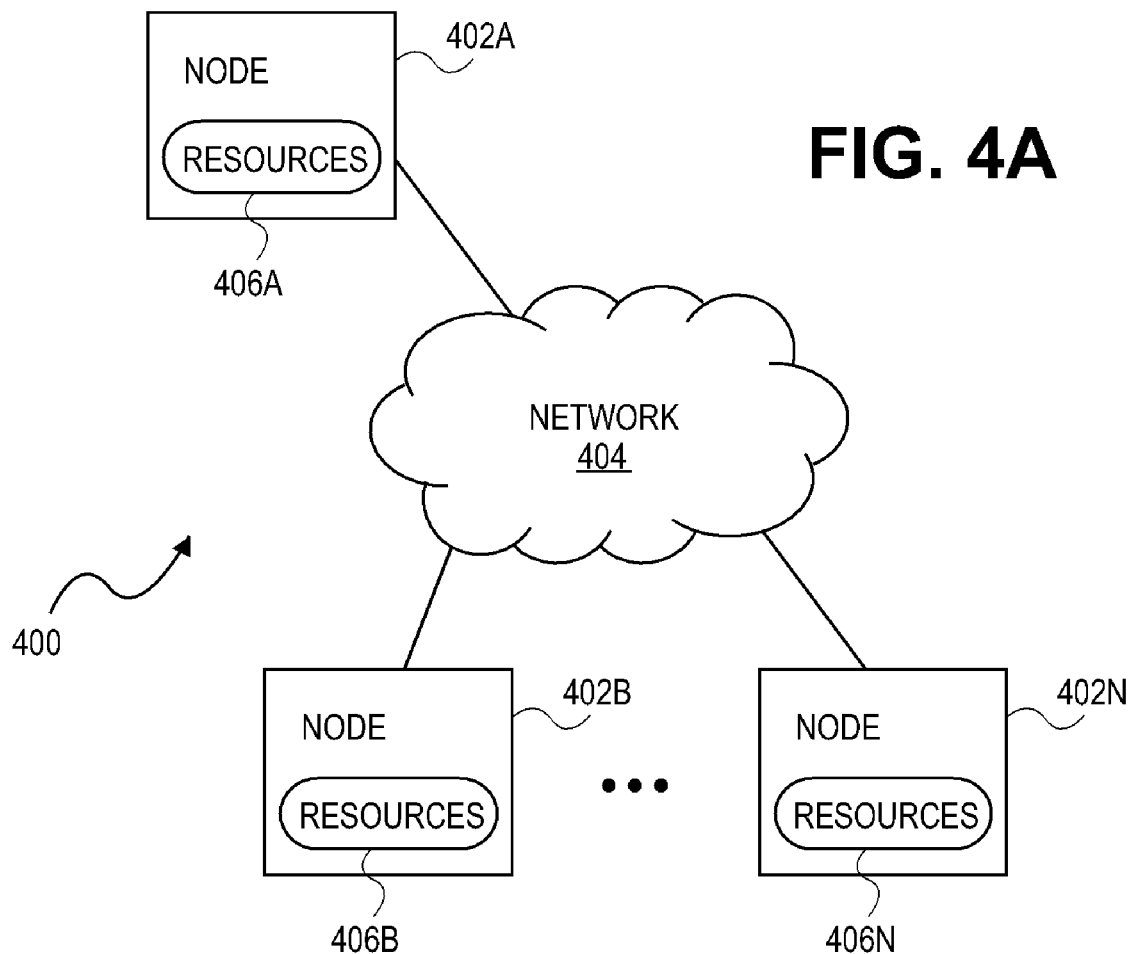
FIGS. 4A and 4B are diagrams of hardware environments in conjunction with which embodiments of the invention may be implemented.
Figure 4B:
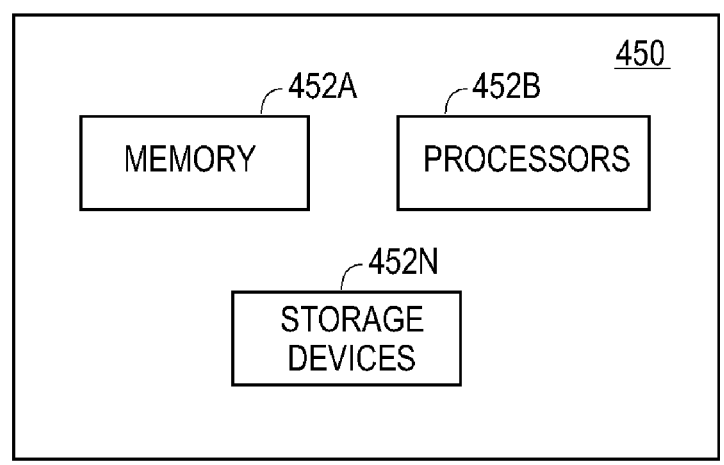

FIGS. 4A and 4B show different hardware environments 400 and 450, respectively, in conjunction with which the object-oriented software environments that have been described may be implemented, according to varying embodiments of the invention. Referring first to FIG. 4A, the hardware environment 400 includes a number of nodes 402A, 402B, ..., 402N, collectively referred to as the nodes 402. The nodes 402 are interconnected with one another via a network 404, which may include one or more of: intranets, extranets, wired networks, wireless networks, telecommunication networks, and the Internet, among other types of networks. The nodes 402 include resources 406A, 406B, ..., 406N, collectively referred to as the resources 406. The resources 406 may include input devices, output devices, memory, processors, storage devices, and other resources commonly employed within hardware environments.

Referring next to FIG. 4B, the hardware environment 450 may be considered as implementing one of the nodes 402 of FIG. 4A, and in which an object-oriented software environment is implemented on a single node, and not distributed over a network of nodes. The hardware environment 450 includes memory 452A, processors 452B, and storage devices 452N, which are collectively referred to as the resources 452, since the memory 452A, the processors 452B, and the storage devices 452N are examples of resources that are commonly employed within hardware environments. The hardware environment 450 may also employ other resources, in lieu of and/or in addition to, the resources specifically depicted in FIG. 4B.

Conclusion

It is noted that, although specific embodiments have been illustrated and described herein, it will be appreciated by those of ordinary skill in the art that any arrangement calculated to achieve the same purpose may be substituted for the specific embodiments shown. This application is intended to cover any adaptations or variations of embodiments of the present invention. Embodiments of the invention may, for instance, be implemented in accordance with the Linux operating systems, as well as other operating systems. It is manifestly intended that this invention be limited only by the claims and equivalents thereof.

I claim:
1. A system comprising:
hardware including one or more of memory, processors, and storage devices;
a first object implemented via the hardware, the first object supporting a first method defined by a first object-oriented interface and a second method defined by a second object-oriented interface, the first object-oriented interface including a password argument to limit access thereto, the second object-oriented interface corresponding to the first object-oriented interface, the second object-oriented interface required by a predetermined specification and lacking a password argument to limit access thereto;
a plurality of second objects implemented via the hardware, the second objects inter-related with the first object, the second objects to attempt to access the first object-oriented interface, the first and second objects sharing a predetermined password, the second objects to pass the predetermined password as the password argument of the first object-oriented interface such that the second objects are able to invoke the first method defined by the first object-oriented interface due to the predetermined password having been passed as the password argument of the first object-oriented interface; and,
a third object implemented via the hardware, the third object not inter-related with the first and second objects, the third object not privy to the predetermined password such that the third object is unable to invoke the first method defined by the first object-oriented interface, such that the first object-oriented interface is queryable by the third object but the first method defined by the first object-oriented interface is uninvokable by the third object due to the third object not sharing the predetermined password, wherein the first and second objects are greater than two in number in total.

2. The system of claim 1, wherein the second objects are to initially query the first object to learn of the first object-oriented interface and the second object-oriented interface.

3. The system of claim 1, wherein the third object is to access the second object-oriented interface, and the first object is in response to return a type of "not implemented" message.

4. The system of claim 1, wherein the second objects are to attempt to access the first object-oriented interface by requesting an object manager to invoke the first method, such that the object manager acts as a broker between the first object and the second objects.

5. An article of manufacture comprising:
a non-transitory computer-readable data storage medium; and,
means in the medium for implementing a first object accessible by a plurality of second objects and by a third object,
wherein the first object supports a first method defined by a first object-oriented interface and a second method defined by a second object-oriented interface, the first object-oriented interface including a password argument to limit access thereto, the second object-oriented interface corresponding to the first object-oriented interface, the second object-oriented interface required by a predetermined specification and lacking a password argument to limit access thereto,
wherein the second objects attempt to access the first object-oriented interface, the first and second objects sharing a predetermined password, the second objects to pass the predetermined password as the password argument of the first object-oriented interface such that the second objects are able to invoke the first method defined by the first object-oriented interface due to the predetermined password having been passed as the password argument of the first object-oriented interface,
wherein the third object is not inter-related with the first and second objects, the third object not privy to the predetermined password such that the third object is unable to invoke the first method defined by the first object-oriented interface, such that the first object-oriented interface is queryable by the third object but the first method defined by the first object-oriented interface is uninvokable by the third object due to the third object not sharing the predetermined password,
and wherein the first and second objects are greater than two in number in total.

6. The article of manufacture of claim 5, wherein the second objects are to initially query the first object to learn of the first object-oriented interface and the second object-oriented interface.

7. The article of manufacture of claim 5, wherein the third object is to access the second object-oriented interface, and the first object is in response to return a type of "not implemented" message.

8. The article of manufacture of claim 5, wherein the second objects are to attempt to access the first object-oriented interface by requesting an object manager to invoke the first method, such that the object manager acts as a broker between the first object and the second objects.

9. A method comprising:
implementing a first object via hardware including one or more of memory, processors, and storage devices, the first object supporting a first method defined by a first object-oriented interface and a second method defined by a second object-oriented interface, the first object-oriented interface including a password argument to limit access thereto, the second object-oriented interface corresponding to the first object-oriented interface, the second object-oriented interface required by a predetermined specification and lacking a password argument to limit access thereto,
wherein a plurality of second objects are inter-related with the first object, the second objects to attempt to access the first object-oriented interface, the first and second objects sharing a predetermined password, the second objects to pass the predetermined password as the password argument of the first object-oriented interface such that the second objects are able to invoke the first method defined by the first object-oriented interface due to the predetermined password having been passed as the password argument of the first object-oriented interface,
wherein a third object is not inter-related with the first and second objects, the third object not privy to the predetermined password such that the third object is unable to invoke the first method defined by the first object-oriented interface, such that the first object-oriented interface is queryable by the third object but the first method defined by the first object-oriented interface is uninvokable by the third object due to the third object not sharing the predetermined password,
and wherein the first and second objects are greater than two in number in total.

10. The method of claim 9, wherein the second objects are to initially query the first object to learn of the first object-oriented interface and the second object-oriented interface.

11. The method of claim 9, wherein the third object is to access the second object-oriented interface, and the first object is in response to return a type of "not implemented" message.

12. The method of claim 9, wherein the second objects are to attempt to access the first object-oriented interface by requesting an object manager to invoke the first method, such that the object manager acts as a broker between the first object and the second objects.

* * * * *